United States Patent [19]

Pirelli

[11] Patent Number: 5,537,313

[45] Date of Patent: Jul. 16, 1996

[54] POINT OF SUPPLY USE DISTRIBUTION PROCESS AND APPARATUS

[75] Inventor: Thomas Pirelli, Buffalo Grove, Ill.

[73] Assignee: Enterprise Systems, Inc., Wheeling, Ill.

[21] Appl. No.: 155,175

[22] Filed: Nov. 22, 1993

[51] Int. Cl.$^6$ ................................................. G06F 15/00
[52] U.S. Cl. ............................................ 364/403; 235/385
[58] Field of Search ................................... 235/376, 385; 340/568; 364/401, 403, 404

[56] References Cited

U.S. PATENT DOCUMENTS

| | | | |
|---|---|---|---|
| 4,717,042 | 1/1988 | McLaughlin | 221/3 |
| 4,785,969 | 11/1988 | McLaughlin | 221/2 |
| 4,857,716 | 8/1989 | Gombrich et al. | 235/462 |
| 4,916,441 | 4/1990 | Gombrich | 345/169 |
| 4,972,318 | 11/1990 | Brown et al. | 364/403 |
| 5,014,875 | 5/1991 | McLaughlin | 221/2 |
| 5,128,861 | 7/1992 | Kagami et al. | 364/403 |
| 5,237,495 | 8/1993 | Morii | 364/401 |
| 5,291,399 | 3/1994 | Chaco . | |
| 5,334,822 | 8/1994 | Sanford | 235/385 |
| 5,393,965 | 2/1995 | Bravman et al. | 235/383 |

OTHER PUBLICATIONS

Fodor; "Software Helps You Keep Stocks Level"; *Industrial Distribution;* v81 n3; pp. 28–32; Feb. 1992; Dialog: File 15, Acc# 00599614.

Trunick; "Can Resource Planning Really Help You? (Part II)"; *Handling & Shipping;* v24; p. 77(5); Jun. 1983; Dialog: File 148, Acc# 01765127.

Groebner, et al.; "Solving the Inventory Problem for the Sale of Seasonal Merchandise"; Journal of Small Business Management; v28 n3; p. 19(8); Jul. 1990; Dialog: File 148, Acc# 04872078.

Tyworth; "The Inventory Theoretic Approach in Transportation Selection Models: A Critical Review"; *Logistics and Transportation Review;* v27 n4; p. 299(20); Dec. 1991; Dialog: File 148, Acc# 05586814.

Kiran, et al.; "An Integrated Decision System for Inventory Management"; *Computers & Industrial Engineering;* v9 n4; pp. 379–386; 1985; Dialog: File 15, Acc# 00300827.

Silver; "Inventory Management–Need Better Customer Service? Then Revamp Your Order Cycles"; *Industrial Distribution;* v68 n9; pp. 91–93; Sep. 1978; Dialog: File 15, Acc# 00082080.

*Primary Examiner*—Gail O. Hayes
*Assistant Examiner*—Stephen R. Tkacs
*Attorney, Agent, or Firm*—David Newman & Associates

[57] ABSTRACT

A method using a central computer and a work station for managing inventory. To dispense inventory to consumers, a system user is issued a card imprinted with a personal user bar code. This user bar code is read into the computer and subsequently verified through the entry of individual user access data to ensure the user is authorized. To issue an item to a consumer, the user must next identify through an input means the particular consumer to whom the item is to be issued. The item to be issued is imprinted with an item bar code. After identifying the consumer, the item bar code is read into the work station and converted to issued-item data. The issued-item data is communicated from the work station to the central computer, where the issued item is decremented from inventory data. The central computer then determines whether each issued item is chargeable to the particular consumer. If the issued-item data is determined to be chargeable to the particular consumer, then the issued-item data is recorded as a charge to that consumer. Finally, the central computer determines when and in what quantity to replenish each item from the inventory data. A replenishment order is processed by the central computer, and the replenishment order is transmitted to a vendor.

11 Claims, 4 Drawing Sheets

POINT OF SUPPLY USE DISTRIBUTION PROCESS AND APPARATUS

BACKGROUND OF THE INVENTION

This invention relates to automating inventory replenishment, and more particularly to work stations equipped with a touch screen, laser bar code scanner, and voice-activated portable computer to allow materials supply personnel to record supply usage, perform all cost accounting functions, and optimize supply replenishment techniques.

DESCRIPTION OF THE RELEVANT ART

In a typical supply distribution chain, items are received, stored, dispensed, and ultimately replaced, with each step in this process requiring manual tracking and recordkeeping to monitor the items. This process, as illustrated in FIG. 1, can be summarized in the following steps.

First, an item is received as part of a package at the receiving dock 11 where a receiving clerk verifies 12 the contents of the package against vendor shipping documents. The package is then moved 13 to the storeroom where product identification labels are printed 14 for each of the items in the package. The items are removed from the packing carton 15, product identification labels are affixed to each item 16, and the items are then placed on the shelf 17 in the storeroom.

While the storeroom serves as the master depository of supplies, the using departments within the institution require intermediate storage areas in closer proximity to the consumer. These intermediate storage areas are referred to as unit supply areas.

After items have been received and placed on the shelf 17 in the storeroom, materials management (MM) staff are dispatched 18 throughout the institution to inventory the supplies in the using department supply areas. These MM personnel count 19 the supplies remaining in a given unit supply area, recording the inventory counts in a hand-held computer for subsequent uploading to the MM system. The inventory counts are then processed 20 and slips known as pick tickets are printed 21. The MM staff then use these pick tickets to remove 22 the required supplies from the storeroom, bringing these items to the unit supply area for replenishment 23.

Concurrent with the supply replenishment process, the using department is continually in the process of dispensing items to the consumers. Departmental staff imprint cards 24 to collect cost accounting item data stickers. As the department staff remove items from the unit supply area for consumer use 25, the product identification labels on the items, which had been affixed to the items 16 in the storeroom, are transferred from the items to the consumer's charge ticket 26.

The item tracking process continues when the consumer charge tickets are collected 27 for data entry 28. Issues are entered into the computer, issue reconciliation 29 is processed, and reconciliation reports 30 are printed.

Finally, storeroom replenishment 31 requirements are determined. This determination is most typically made on the basis of one of several traditional systems of reordering. These systems have included a critical threshold approach, in which an item is reordered when its quantity reaches a previously set minimum level; a predetermined threshold approach, in which stock levels are assessed at a predetermined time and reorders are made on the basis of current stock levels; a par level approach, in which a maximum desirable number of storeroom units is determined and the reorder quantity equals the number of units below this predetermined number; and a minimum/maximum approach, in which, like the par level system, a maximum desirable number of storeroom units is predetermined but reorders to maintain this maximum desirable number are not initiated until stocked items fall below a predetermined minimum threshold number. Whichever approach is employed, once replenishment requirements are determined, purchase orders are created 32 and then transmitted 33 to the vendor. The supply distribution cycle is completed when the vendor eventually ships new supplies back to the institution's receiving dock 11. This process constitutes twenty-three individual steps and handling points for the items and associated data.

SUMMARY OF THE INVENTION

A general object of the invention is to automate and optimize inventory replenishment using computer technology.

A second object of the invention is to provide cost accounting information.

Another object of the invention is to eliminate manpower required for department inventory costs and cost accounting.

A further object of the invention is to optimize the supply replenishment process such that supplies are reordered only when they are needed, in quantities which reflect actual institutional needs, and dynamically, in direct response to changing institutional needs.

A still further object of the invention is to track issues to each consumer with greater accuracy and at less expense, both for the consumer's benefit and for the benefit of the organization in competitive bidding situations.

An additional object of the invention is to monitor the distribution of supplies to consumers by providing a record of system users and consumer consumption.

According to the present invention, as embodied and broadly described herein, a method using a central computer and at least one work station for tracking inventory of a plurality of items is provided. These items could include medication, meals, office supplies, rental equipment, magazines, newspapers, candy, etc. The method comprises the steps of inputting to the central computer, item information for each item, inventory information for each item, user information for each user, and consumer information for each consumer. The item information includes item name, item bar code, item cost, and item charge status. The inventory information includes number of items in inventory referenced to item name, item bar code, and item cost. The user information includes user name, user bar code, and user access data. The consumer information includes consumer name and consumer billing information. Consumer information could also include consumer-specific information necessary to cross reference items being dispensed against known consumer sensitivities.

The steps also include, at the work station, touching a touch-sensitive screen to select a particular user or scanning a user bar code for each individual user who will dispense items to the consumers. The particular user is identified through the work station by a particular user bar code or user name and individual user access information. Such a user would be anyone authorized by the relevant institution to dispense items. In a hospital, for example, a particular user might be a nurse, doctor, or other health care provider. Each user preferably has a card imprinted with his or her bar code on the card. Before issuing any items to the consumers, the user first enters his or her password on the touch-sensitive screen or scans his or her bar code into the work station. Using a bar-coded password identification ensures that only authorized users can enter the system.

The steps next include identifying the specific consumer to whom an item is to be issued. In the preferred embodiment, this identification is made through appropriate pressure applied to a touch-sensitive screen at the work station. The item bar code is then applied to the consumer's billing information through the identification of the consumer through the touch-sensitive screen.

Alternatively, the consumer could be identified through the scanning of a consumer bar code issued to the particular consumer. Again, by way of example, in a hospital each patient may be considered a consumer. The hospital issues a bar code to each patient, i.e., consumer, as that consumer is admitted to the hospital. The card bearing the consumer's bar code is subsequently located in the room with the consumer. When the health care provider or other authorized user issues an item to that consumer, the consumer's bar code is entered into the work station, followed by the item bar code. The item bar code is then applied to the consumer's billing information through the entered reference to the consumer's bar code.

The steps also include communicating data on the item selected from the work station to the central computer, and determining at the central computer whether each item issued is chargeable to the particular consumer. If the issued item is found to be chargeable to the particular consumer, then the data on the issued item is recorded as a charge to the particular consumer and included as such in that consumer's billing information. Concurrently, the issued item is decremented from inventory.

The steps further include determining whether or not the item has been sufficiently depleted to warrant replenishing each item listed in the inventory data. The central computer makes this determination under the Dynamic Order Theory on the basis of a number of dynamically changing variables. These variables include the number of that particular type of unit which must be kept in reserve, the number of days required to receive that item upon reorder, the number of days between inventory review, and the average number of that type of unit used each day. In tracking these variables from day to day, the computer is able to optimize the types of units reordered to the specific and actual needs of the specific inventory location at any given time.

Upon determining that an item needs to be replenished, the central computer then calculates the optimal number of units to be reordered under the Dynamic Order Theory on the basis of additional, also dynamically changing, variables. These variables include the maximum number of that item typically maintained in a given inventory location, the number of days required to receive that unit upon reorder, the average number of that type of unit used each day, the number of that type of unit already on order but not yet received, and the number of that type of unit currently in stock. Again, in closely tracking these variables, the computer is able to optimize the number of units reordered to best match the specific and actual needs of the institution. Once the desired quantity is determined, a replenishment order is processed by the central computer, and the replenishment order is transmitted to a vendor.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
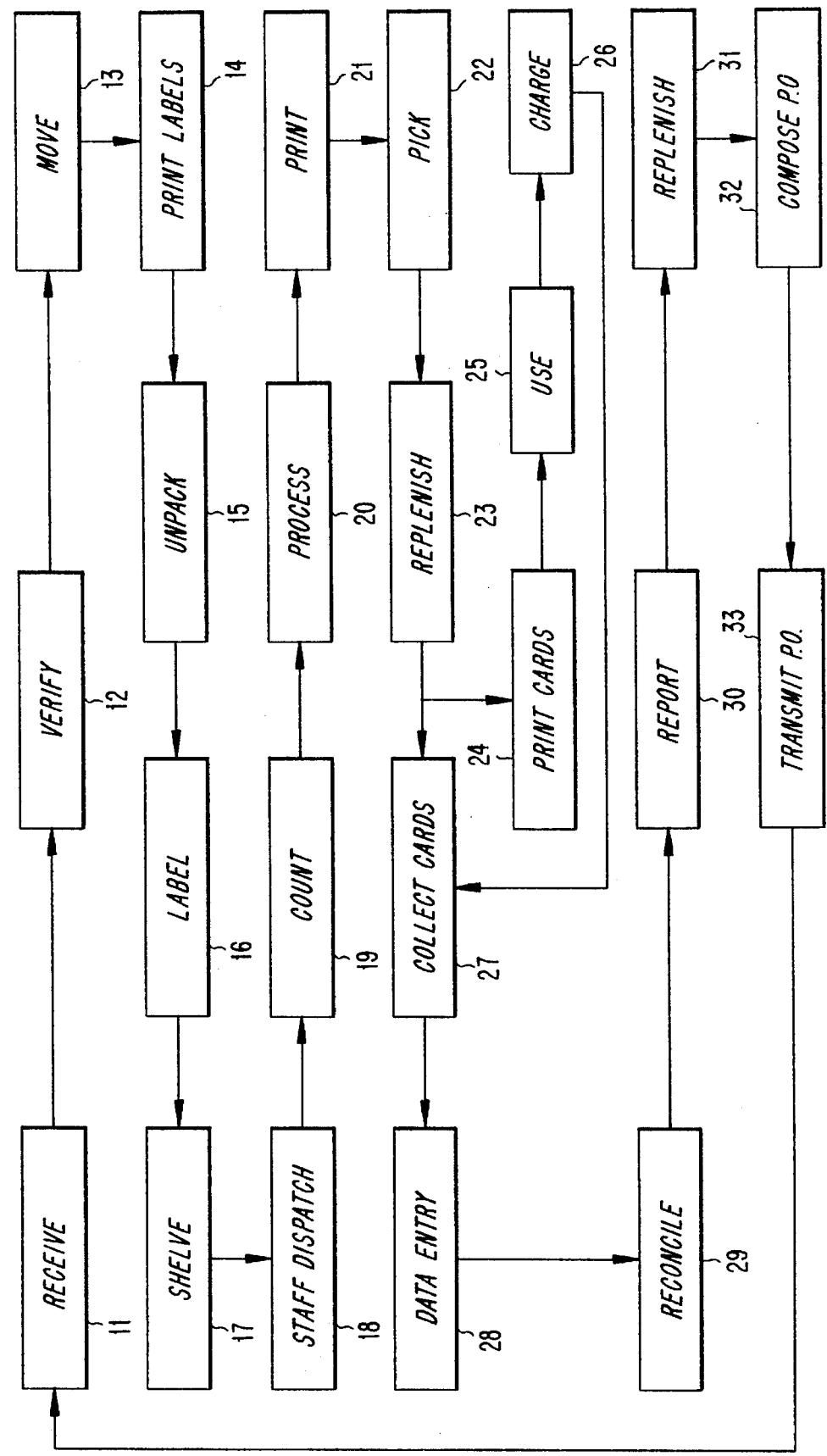
FIG. 1 is a flowchart of current inventory supply and replenishment

Reference now is made in detail to the present preferred embodiments of the invention, examples of which are illustrated in the accompanying drawings, wherein like reference numerals indicate like elements throughout the several views.

Figure 2:
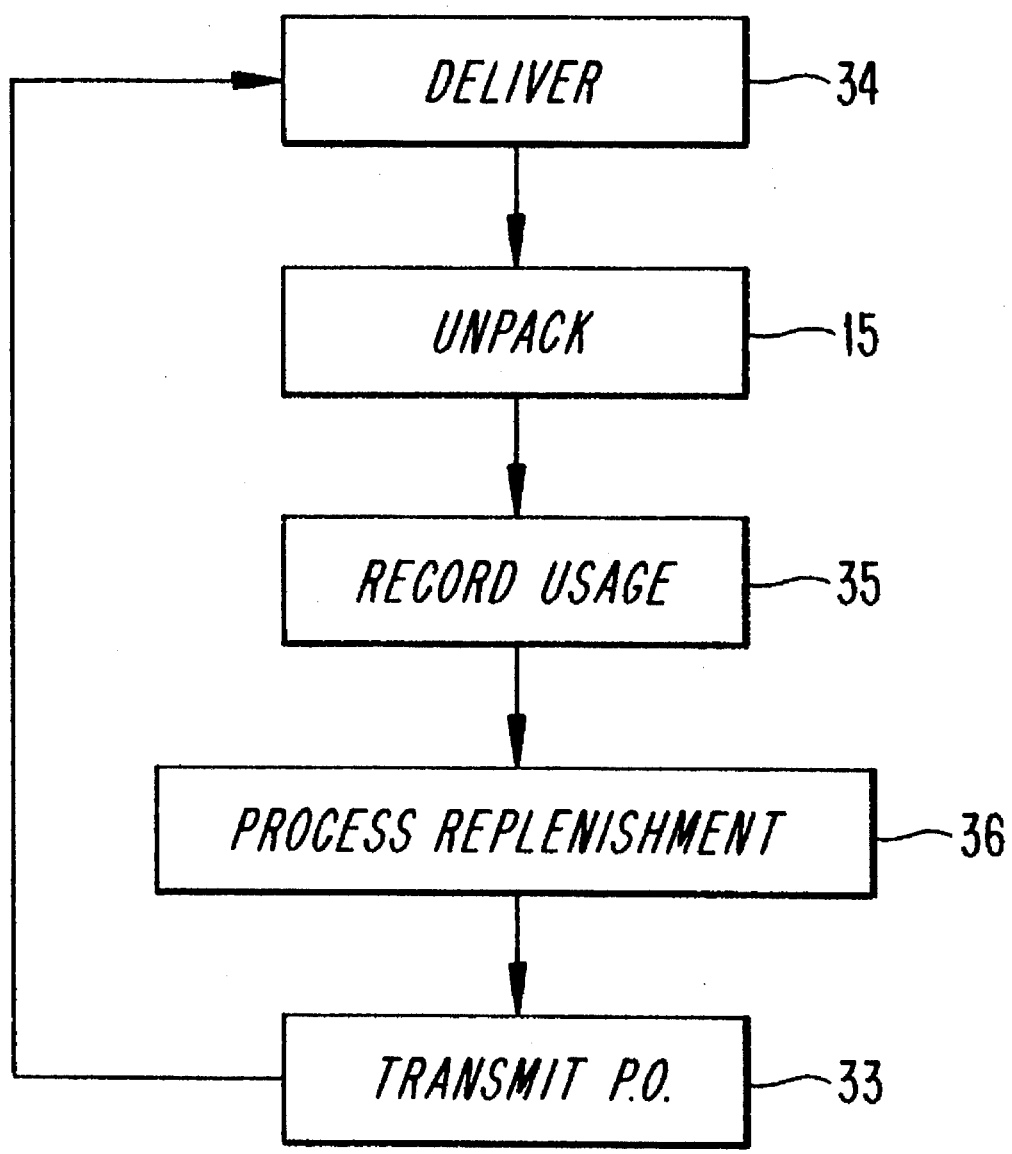
FIG. 2 is a flowchart of automated inventory supply and replenishment.

As illustratively shown in FIG. 2 the invention reduces what had formerly been the twenty-three step process of. FIG. 1 to five steps. First, supplies are delivered 34 from the vendor directly to the supply area, where assistants unpack 35 and place the supplies on the shelves. Each time a staff member removes an item for consumer use, the bar code on the unit is scanned in order to record 36 the issuance of the item to the consumer and decrement the unit inventory. Once inventory reserves are deemed sufficiently low, unit replenishment 37 is initiated through the conversion of unit inventory information into purchase orders. These purchase orders are then transmitted 38 to the vendor for shipment of new supplies back to the using departments.

Figure 3:
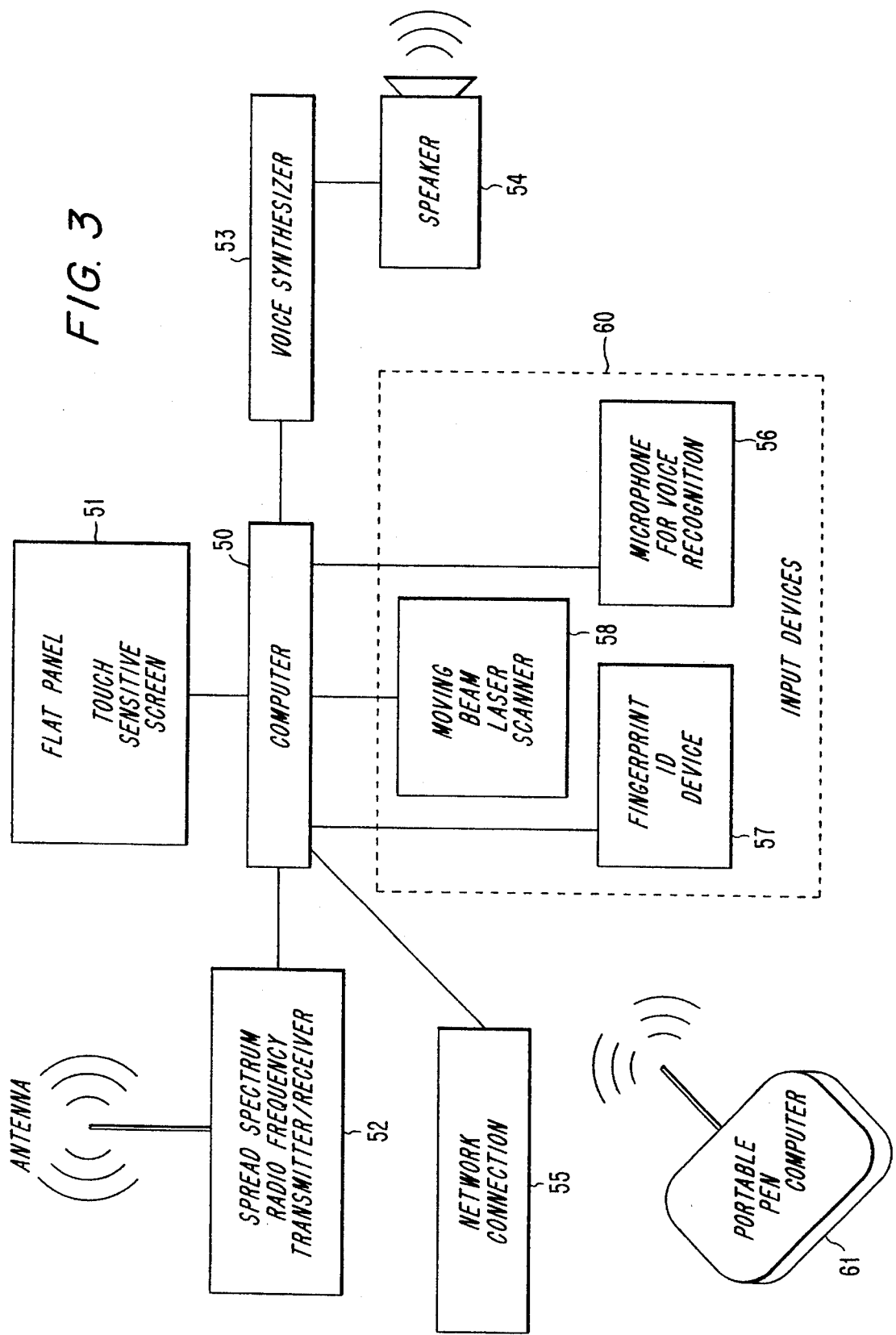
FIG. 3 is a diagram of a central computer and portable computer.

In the exemplary arrangement shown in FIG. 3, the present invention uses a central computer 50 and a work station embodied as a portable computer 61. The central computer 50 includes a flat panel touch-sensitive screen 51, a printer 49, a voice synthesizer 53, a speaker 54, a network connection 55, a radio frequency (RF) transmitter and receiver 52, and an input device 60. The input device facilitates identifying a user or consumer and may be embodied as a microphone 56, a fingerprint identification device 57, or a moving beam laser scanner 58. A number of other devices may also serve to accomplish the same function and, by way of example, may include an input device requiring a password or smart card using public key encryption technology, DNA detectors, eye scan, or any other device for identifying a user, consumer and/or item from inventory. Although in FIG. 3 the input device is shown connected to the central computer 50, the input means alternatively may be connected to the work station 61. Typically, the work station 61 has a touch-sensitive screen for entering consumer information, a voice input means embodied herein as a microphone 62 for entering quantity or other data, and a laser scanner 63 for reading user and item bar codes. The identifying function performed in the central computer 50 or in the work station 61 is transmitted via RF link.

The flat panel touch-sensitive screen 51, printer 49, input means 60, RF transmitter and receiver 52, and voice synthesizer 53 are connected or coupled to the central computer 50. The printer 49 facilitates tracking of issues and inventory through the provision of hard copy records when required. The portable computer 61, in addition to having a microphone 62 and a laser scanner 63, is equipped with an RF transmitter and receiver 64 similar to the RF transmitter and receiver 52 connected to the central computer 50. The portable computer 61 communicates with the central computer 50 through the RF transmitters and receivers 52 64, as is well known in the art. While not required, the RF transmitters and receivers could use spread-spectrum modulation in that spread-spectrum is thought to be a preferred modulation, operating in the Part 15 band, allocated by the Federal Communications Commission.

Figures 4A, 4B:
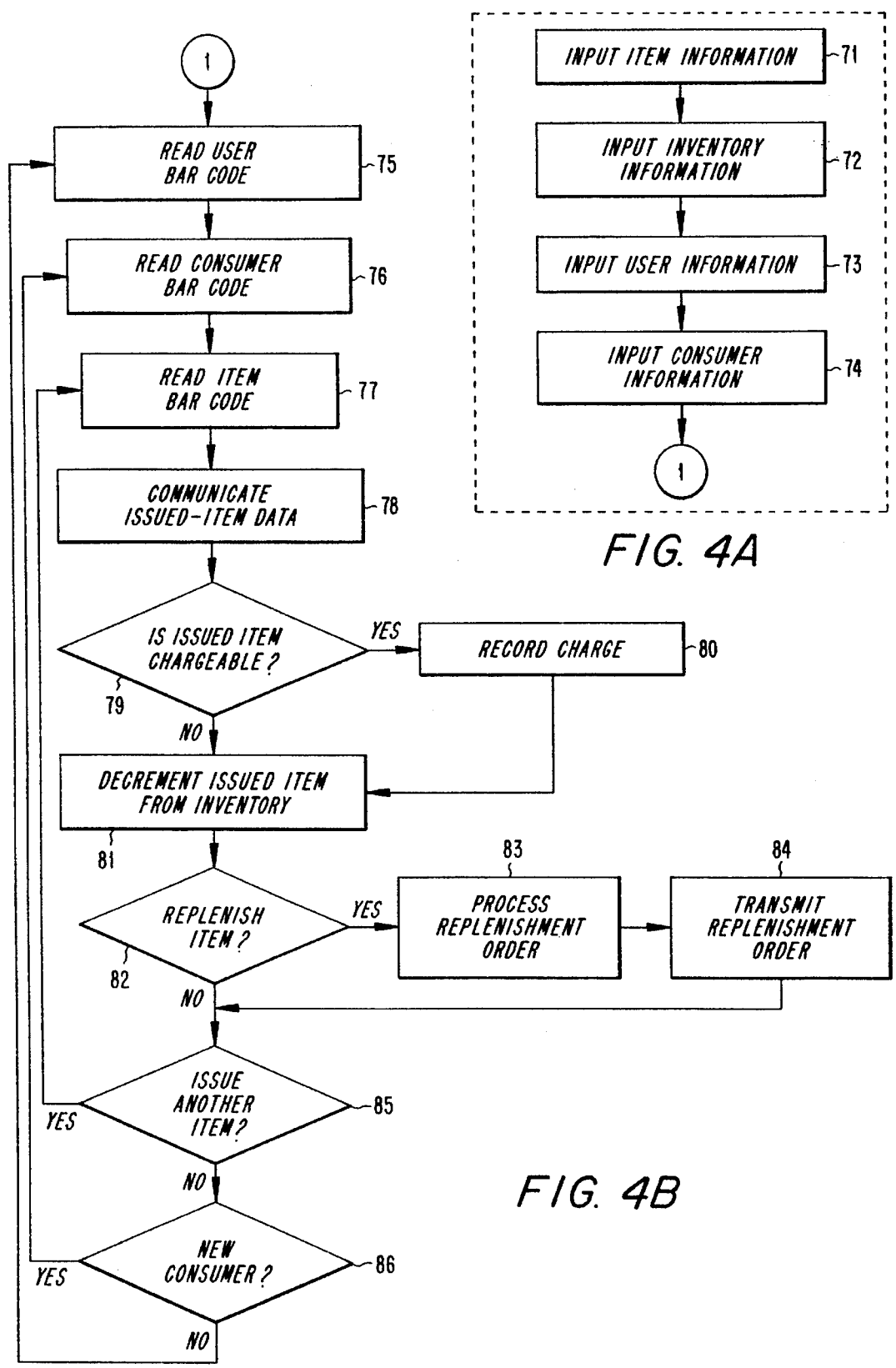
FIGS. 4A and 4B present a flowchart of the supply and replenishment method of the present invention.

The method uses a central computer 50 and at least one work station 61 for tracking the inventory of a plurality of items. Referring to FIG. 4A, the method comprises the steps of inputting 71 to the central computer 50 item information for each item, inputting 72 inventory information for each item, inputting 73 user information for each user, and inputting 74 consumer information for each consumer.

The item information includes item name, item bar code, item cost, and item charge status. The item is defined in a Master Item File by, for example, description, order and issue unit of measure, expense code, and whether the item is taxable, consumer chargeable, stocked in inventory, etc. The item and the item bar code are cross referenced according to standard type, e.g., UPC, HIBCC, Code 39. Ancillary supply areas are defined, and items maintained in department inventory are defined.

The inventory information includes the number of items in inventory referenced to item name, item bar code, and item cost.

System users are defined by a unique identification code. The user information includes user name, user bar code, and user access data.

The consumer information includes consumer name and consumer billing information. Optionally, the consumer information could also include data on consumer sensitivities, current prescribed medications or ordered supplies, or other similar information that could influence the consumer's amenability to additional medications, kinds of food, supplies, etc. In the event a system user attempted to dispense an item to a consumer which would conflict with that consumer's current medication or supply consumption, or other pattern of consumption, the system would block entry of that item, thereby notifying the system user of a potential problem. The inclusion of this type of information in the central computer serves as an additional check on item distribution, going beyond the purpose of maintaining inventory to providing a means of monitoring consumer sensitivities as well. This "item check" feature is further enhanced through the provision of digitized, on-screen images on the work station. Such digitized images allow the user to request a pictorial representation of a given item to clarify any confusion as to the nature or identity of the item requested. Alternatively, or in conjunction with these digitized images, a voice synthesizer may also be used to confirm requested item identity.

To begin the supply distribution process, as summarized in FIGS. 4a and 4B, a selected item is issued to a consumer by first entering or scanning user identification. By way of example, in a hospital a particular user might be a nurse, doctor, or other medical assistant. Each user has a card imprinted with his or her own particular bar code. The user is identified through the work station 61 by this particular user bar code along with individual user access data. First, the user bar code is read 75, allowing the user to be identified. The user identification is then verified through the use of the individual user access data. For example, user-access data may be the fingerprints of the user, which are read and verified against the user bar code. Once the user has been identified as an authorized user, the central computer recognizes the user as "logged in" and allow items to be issued by that user to consumers.

Whether or not the user would have to re-enter his or her full user information for each item to be issued would depend on the security needs of the institution. For maximum security, the system could be configured such that the user would have to re-enter his or her bar code and user access data prior to issuance of every item. This may be desirable to prevent unauthorized issuance of items in the event the user had completed the "log-in" process but then had to leave the portable work station temporarily unattended. If a lesser degree of security would be sufficient, as when a user is making rounds such that repeated full user identification procedures would be onerous, the "log-in" process could be simplified. The user could be allowed, after having entered bar code and access information when initially "logging into" the system, to re-scan only his or her bar code for each item. Finally, the default configuration for the system would enable the user to "log-in" once and thereafter issue as many items as needed without reentering any user information.

The next step in the issuance of a selected item is identification of the consumer. To issue an item to a consumer, the user must apply the appropriate pressure to the touch-sensitive screen at the work station necessary to identify the particular consumer. The user identifies the consumer 76 through the touch-sensitive screen prior to issuing the item.

An alternate method of entering user-identification information requires the use of consumer bar codes similar to the user bar codes. As an illustration of this alternative method and by way of example, a hospital may issue a consumer bar code to each patient/consumer upon admittance to the hospital. The card with the consumer bar code would thereafter be located in the room with the consumer. When a system user prepares to issue an item to that consumer, the consumer is identified through the work station 61 by the consumer bar code on the card.

Once the user and the consumer have been identified and found to be authorized, the item bar code of the item to be issued is read 77 by the laser scanner 63 and a quantity of the item to be issued is input via the microphone 62. Thus, the steps also include, at the work station 61, scanning 77 an item bar code for each item issued to a particular consumer and specifying through voice input, embodied by way of example as a microphone 62, an item quantity. Alternatively, both quantity and item identification information may be entered via the microphone. The issued item may be medication, a meal, office supplies, rental equipment, magazines, newspaper, candy, etc. The item bar code is scanned and quantity entered to decrement department inventory, record usage, and charge the consumer for item use. In addition, if the central computer contains consumer-specific information such as current prescribed medications or currently ordered office supplies, etc., the item bar code would also be scanned to verify that the intended consumer will find the issued item compatible. When read 77, the issued item bar code is converted to issued-item data.

If several items were to be issued to one consumer, the system could be configured in one of two ways. The first alternative would allow the user to complete the consumer identification process once and to then issue as many items to that consumer as desired, all based on that initial identification through the touch-sensitive screen. A second alternative would require the user to re-identify the consumer through pressure on the touch-sensitive screen for every item to be issued. Under the first alternative, it would be possible for the user to issue several items to a first consumer, move on to a second consumer, forget to properly identify the second consumer, and subsequently issue items to the second consumer which would be charged to the first consumer. The second alternative, by requiring that the consumer be identified prior to the issuance of every item, is desirable as a guard against this risk of charges being inadvertently entered against the wrong consumer.

These two alternatives would also exist were the alternative method of consumer bar codes to be used. The user could be required to scan the consumer's bar code once and thereafter be allowed to issue as many items to that consumer as desired. The second alternative would require the consumer bar codes and the item bar codes to be entered in pairs, i.e., the user would have to re-scan the consumer's bar code for every additional item to be issued. Again, the advantage to the second alternative is the avoidance of possible erroneous charges being applied to the account of the wrong consumer.

As shown in FIG. 4B, the steps include communicating 78 the issued-item data from the work station 61 to the central computer 50, and determining 79 at the central computer 50 whether each issued item is chargeable to the particular consumer. If the issue item is chargeable to the particular consumer, then the issued-item data are recorded 80 as a charge by updating the consumer's charge file. The issued item also is decremented 81 from inventory data to update the department inventory file and, at the same time, a daily usage file is updated.

To best utilize this dynamic inventory monitoring system, a recommended order report is generated daily using the Dynamic Order Theory to calculate a Dynamic Order Point and a Dynamic Order Quantity. The central computer 50 determines when to replenish 82 each item in the inventory data. If an item is to be replenished 82, then a replenishment order is processed 83 by the central computer 50, and the replenishment order is transmitted 84 to a vendor.

Dynamic Order Point/Dynamic Order Quantity (DOP/DOQ)

The DOP/DOQ theory is an algorithm used by the present invention to calculate the level at which supplies must be reordered and an optimum quantity to reorder to ensure neither a stock-out nor excess stock situation will occur. The Dynamic Order Theory allows the present invention to:

1. Respond immediately to fluctuations in supply demand which affect inventory reorder points and reorder quantities.
2. Accommodate irregular ordering cycles.

The DOP/DOQ theory uses both user-defined and system-calculated variables to determine reorder points and reorder quantities. User-defined variables include Maximum Days Inventory, Safety Stock Days, and Review Time Days. System-calculated variables include Average Daily Usage, Lead Time Days, On-Hand Quantity, Open Order Quantity, Dynamic Order Point, and Dynamic Order Quantity. A definition of each variable follows:

Maximum Days Inventory (User-Defined)

Maximum Days Inventory (MDI) is the maximum quantity of an item maintained in a given inventory location.

Safety Stock Days (User-Defined)

Safety Stock Days (SSD) represents the number of days of inventory maintained in reserve. This safety stock provides a buffer in case of a sudden increase in demand or an inability of a supplier to fill an order within the normal number of Lead Time Days.

Review Time Days (User-Defined)

Review Time Days (RTD) is the number of days between inventory review or order placement.

Average Daily. Usage (System-Calculated)

The Average Daily Usage (ADU) is a value calculated based on the past 30 days or other user-defined period of usage.

Lead Time Days (System-Calculated)

Lead Time Days (LTD) is the amount of time that elapses between placing an item on order and receiving the item back into inventory.

On-Hand Quantity (System-Calculated)

On-Hand Quantity (OHQ) is the number of a given type of unit currently on the shelves ready for use.

Open Order Quantity (System-Calculated)

Open Order Quantity (OOQ) is the number of a given type of unit already on order but not yet received.

Dynamic Order Point (System-Calculated)

Dynamic Order Point (DOP) is a floating point at which the system determines an item should be reordered. It is calculated using the following equation:

$$((SSD)+(RTD)+(LTD))*(ADU)$$

Assuming the number of Safety Stock Days to be one, the number of Review Time Days to be zero, the number of Lead Time Days to be one, and the Average Daily Usage to be five, the Dynamic Order Point would be ten as shown in the equation:

$$DOP=((1+0+1))*5=10$$

If the item's current On-Hand Quantity is greater than the Dynamic Order Point, the unit does not yet need to be reordered. If an item's current On-Hand Quantity is less than or equal to the Dynamic Order Point, the system will continue to calculate a Dynamic Order Quantity.

Dynamic Order Quantity (System-Calculated)

Dynamic Order Quantity (DOQ) is the quantity to be ordered to bring an item back to a desired inventory level. It is calculated using the following equation:

$$DOQ=((MDI+LTD)*(ADU))-((OHQ+OOQ))$$

Assuming the number of Maximum Days Inventory to be five, the number of Lead Time Days to be one, the Average Daily Usage to be five, the On-Hand Quantity to be twelve, and the Open Order Quantity to be zero, the Dynamic Order Quantity would be eighteen as shown in the equation:

$$DOQ=((5+1)*5)-(12+0)=18$$

After determining that the DOP threshold has been reached or fallen below, and then calculating the DOQ, the computer generates a purchase order which is sent to a vendor or supplier system.

In use, the present invention uses a central computer and at least one work station. The central computer includes a flat panel touch sensitive screen, a printer, a voice synthesizer, a speaker, a network connection, a radio frequency transmitter and receiver, and an input device. The work station may be embodied as a portable computer. The work station uses a laser scanner, a voice input mechanism, and an RF transmitter and receiver.

A system user is issued a card imprinted with a personal user bar code. With this card, the user "logs in" to the system using a two-step procedure. First, the personal bar code of the user is scanned into the portable computer for initial identification. To complete the "log in" procedure, the user must then input specific individual user access data. The computer cross references the user access data with the scanned user bar code to verify the user's identification.

A consumer is identified through a touch-sensitive screen at the work station. To issue an item to that consumer, the user, who has first logged in, must identify the consumer through the application of appropriate pressure to the touch-sensitive screen.

As an alternative means of securing consumer identification, a consumer could be issued a card bearing a unique consumer bar code. This card would remain with the consumer. To issue an item to that consumer, the user, who has first logged in with his or her own user bar code, would next scan the consumer's bar code into the system using the portable computer.

An item, which could be medication, a meal, a magazine or newspaper, candy, office supplies, rental equipment, etc., is imprinted with an item bar code. To issue an item to a consumer, the user, after first logging in with his or her own user bar code and then identifying the consumer, must next scan the item bar code into the system using the scanner attached to the portable computer and then specify an item quantity using the microphone, also attached to the portable computer. This information is then transmitted to the central computer via the RF link.

The central computer, upon receiving the item bar code and quantity and identifying the consumer, decrements department inventory, records usage, and charges the consumer for item use. Transparent to the user, the central computer also calculates a Dynamic Order Point (DOP) for the item, determines whether current inventory on that item is greater than the DOP and, in the event the DOP threshold has been reached or fallen below, calculates a Dynamic Order Quantity and generates a purchase order for the required number of the item.

The present invention provides point of use automation for ancillary department inventory replenishment. Work stations equipped with a touch-sensitive screen and laser bar code scanner allow department personnel to record supply usage, capture cost accounting data and complete inventory adjustments in a single step. The present invention provides operational advantages over the traditional replenishment methods of supply distribution by eliminating the manpower otherwise required for daily department inventory counts and cost accounting capture. Where items are bar-coded by the manufacturer at the unit of use, production and application of bar code stickers for chargeable items is eliminated. Simultaneous capture of issue, charge and usage data in one step eliminates many of the errors which can be introduced in the many steps of traditional replenishment approaches.

It will be apparent to those skilled in the art that various modifications can be made to the supply distribution method and apparatus of the instant invention without departing from the scope or spirit of the invention, and it is intended that the present invention cover modifications and variations of the supply distribution method and apparatus provided they come within the scope of the appended claims and their equivalents.

I claim:

1. A method using a central computer and at least one work station for tracking inventory of a plurality of items, comprising the steps, using said central computer and said work station, of:

a. defining, by a user, a maximum days inventory value, a safety stock days value and a review time days value for an item;

b. inputting to said central computer, by a user, the maximum days inventory value, the safety stock days value and the review time days value;

c. calculating, by said central computer, an average daily usage value, a lead time days value, an on-hand quantity, and an open order quantity for the item;

d. adding, by said central computer, the safety stock days value, the review time days value, and the lead time days value to generate a first sum;

e. multiplying, by said central computer, the first sum and the average daily usage value to generate a quantity representing a Dynamic Order Point for the item;

f. comparing the Dynamic Order Point to the on-hand quantity;

g. identifying a particular consumer at said work station;

h. inputting, at said workstation, item identification information for each item issued to the particular consumer as issued-item data;

i. communicating the issued-item data from said work station to said central computer;

j. decrementing, in said central computer, the issued item from the on-hand quantity;

k. comparing the Dynamic Order Point to the on-hand quantity;

l. adding, by said central computer, responsive to the Dynamic Order Point being at least equal to the on-hand quantity, the maximum days inventory value and the lead time days value to generate a second sum;

m. multiplying, by said central computer, the second sum and the average daily usage value to generate a product;

n. adding, by said central computer, the on-hand quantity and the open order quantity to generate a third sum;

o. subtracting, by said central computer, the third sum from the product to generate a quantity representing a Dynamic Order Quantity for the item;

p. generating a replenishment order for purchasing the Dynamic Order Quantity of the item;

q. transmitting the replenishment order to a vendor; and r. incrementing the open order quantity by the Dynamic Order Quantity.

2. The method as set forth in claim 1 wherein the step of (h) inputting item identification information for each item issued, includes the steps of:

scanning an item bar code; and inputting a quantity, using voice input means, of each item issued.

3. The method as set forth in claim 1 wherein the step of (h) inputting item identification information for each item issued, includes the step of:

inputting item identification information and a quantity, using voice input means, for each item issued.

4. The method as set forth in claim 1 wherein the step of identifying the particular consumer includes the step of:

applying appropriate pressure to a touch-sensitive screen to identify the particular consumer.

5. The method as set forth in claim 1 wherein the step of identifying the particular consumer includes the steps of:

inputting a consumer bar code; and reading at said work station the consumer bar code.

6. A method using a central computer and a work station for tracking inventory of an item by calculating a Dynamic Order Point and a Dynamic Order Quantity for the item, comprising the steps, using said central computer and said work station, of:

a. defining, by a user, a maximum days inventory value, a safety stock days value and a review time days value for the item;

b. inputting to said central computer, by a user, the maximum days inventory value, the safety stock days value and the review time days value;

c. calculating, by said central computer, an average daily usage value, a lead time days value, an on-hand quantity, and an open order quantity for the item;

d. adding, by said central computer, the safety stock days value, the review time days value, and the lead time days value to generate a first sum;

e. multiplying, by said central computer, the first sum and the average daily usage value to generate a quantity representing the Dynamic Order Point for the item;

f. reading at said work station an item bar code for each item issued to a particular consumer as issued-item data, by a particular user identified through the work station by a particular user bar code and particular user access information of the particular user, for each item dispensed to the particular consumer identified through said work station by an input means;

g. communicating the issued-item data from said work station to said central computer;

h. decrementing, in said central computer, the issued item from the on-hand quantity;

i. comparing the Dynamic Order Point to the on-hand quantity;

j. adding, by said central computer, responsive to the Dynamic Order Point being greater than the on-hand quantity, the maximum days inventory value and the lead time days value to generate a second sum;

k. multiplying, by said central computer, the second sum and the average daily usage value to generate a product;

l. adding, by said central computer, the on-hand quantity and the open order quantity to generate a third sum;

m. subtracting, by said central computer, the third sum from the product to generate the Dynamic Order Quantity for the item;

n. generating a purchase order for purchasing the Dynamic Order Quantity of the item; and o. transmitting the purchase order to a vendor for replenishment of the item.

7. The method as set forth in claim 6 wherein the input means comprises a touch-sensitive screen.

8. The method as set forth in claim 6 wherein the input means comprises a particular consumer bar code.

9. The method as set forth in claim 6 further comprising the steps of:

repeating steps (a) through (o) for a second item type.

10. A method, using a computer, for monitoring an inventory of an item at a location, comprising the steps of:

defining, by a user, a maximum days inventory value, a safety stock days value and a review time days value for the item;

inputting to the computer, by a user, the maximum days inventory value, the safety stock days value and the review time days value;

calculating by the computer, an average daily usage value, a lead time days value, an on-hand quantity, and an open order quantity for the item;

adding, by the computer, the safety stock days value, the review time days value, and the lead time days value to generate a first sum;

multiplying; by the computer, the first sum and the average daily usage value to generate a quantity representing a Dynamic Order Point for the item;

comparing the Dynamic Order Point to the on-hand quantity;

calculating, responsive to the Dynamic Order Point being at least equal to the on-hand quantity, a quantity representing a Dynamic Order Quantity for the item;

generating a replenishment order for purchasing the Dynamic Order Quantity of the item;

transmitting the replenishment order to a vendor.

11. The method as set forth in claim 10, the step of calculating a quantity representing a Dynamic Order Quantity further comprising the steps of:

adding, by the computer, the maximum days inventory value and the lead time days value to generate a second sum;

multiplying, by the computer, the second sum and the average daily usage value to generate a product;

adding, by the computer, the on-hand quantity and the open order quantity to generate a third sum; and subtracting, by the computer, the third sum from the product to generate the Dynamic Order Quantity for the item.

* * * * *